Oct. 31, 1967     L. NEUBAUER     3,350,118

FITTING FOR TUBING

Filed Sept. 29, 1964

INVENTOR.
LOUIS NEUBAUER
BY
*Flehr and Swain*
ATTORNEYS

United States Patent Office 3,350,118
Patented Oct. 31, 1967

3,350,118
FITTING FOR TUBING
Louis Neubauer, Redwood City, Calif., assignor to Beckman Instruments, Inc., a corporation of California
Filed Sept. 29, 1964, Ser. No. 400,087
2 Claims. (Cl. 285—305)

This invention relates generally to a fitting for tubing and more particularly for a fitting for attaching glass tubing to associated apparatus.

Fittings for attaching glass tubing to associated apparatus are often unwieldly. For example, in chromatographic apparatus, the fittings consist of many parts. Another objection to prior art fittings is that they leak at high pressures.

It is a general object of the present invention to provide an improved fitting for glass tubing.

It is a further object of the present invention to provide a fitting which is easily and quickly applied.

It is another object of the present invention to provide a relatively inexpensive fitting.

It is a further object of the present invention to provide a fitting which can withstand relatively large pressures.

It is still a further object of the present invention to provide a fitting which is simple and strong in construction.

The foregoing and other objects of the invention will become more clearly apparent from the following description when taken in conjunction with the drawing.

Referring to the drawings.

Figure 1:
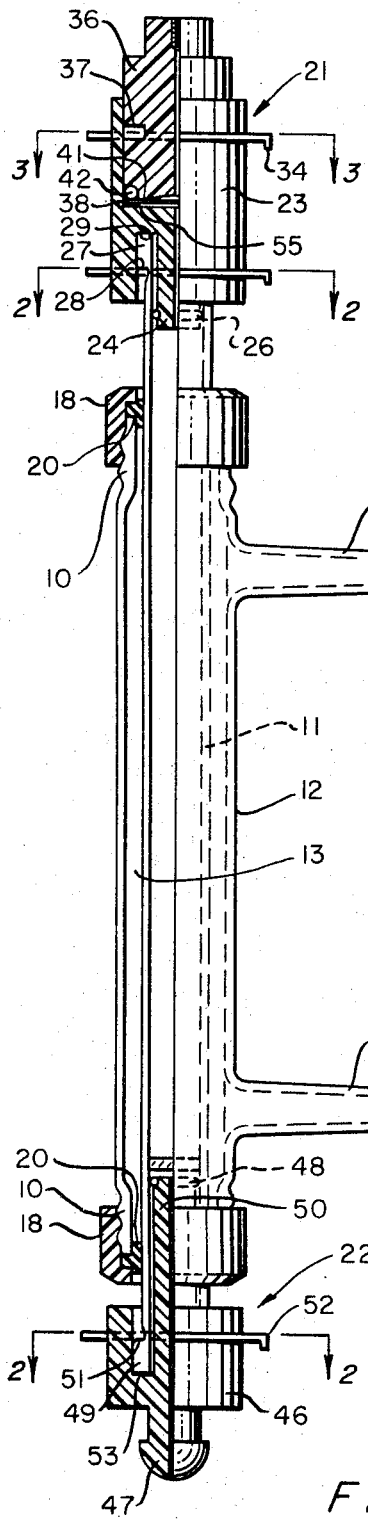
FIGURE 1 is an elevational view, partly in section, of a chromatographic column including fittings in accordance with the invention.
Figure 2:
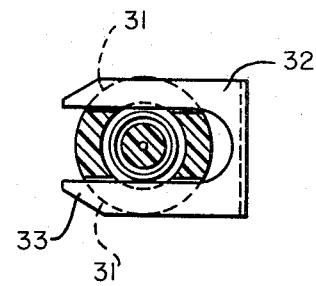
FIGURE 2 is a sectional view taken along the line 2—2 of FIGURE 1.
Figure 3:
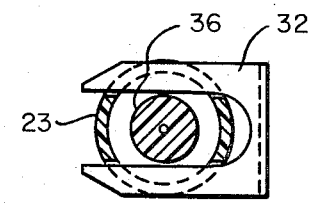
FIGURE 3 is a sectional view taken along the line 3—3 of FIGURE 1.

Referring to FIGURE 1, the apparatus illustrated includes a chromatographic glass column 11 which is surrounded by tubing 12 to define therebetween water jacket 13. The tubing 12 includes inlet and outlet connectors 16 and 17 through which water or other coolant flows to maintain the column 11 at a predetermined temperature. The jacket is completed by means of a sealing gasket 20 which encircles the column 11 and is engaged by a retaining nut 18 threadably received by the end 10 of the tube 12. Tightening of the nut serves to urge the gasket into sealing relationship between the column 11 and the surrounding jacket 12.

As is well known in the art, the column 11 is packed with resin particles to provide the requisite ion exchange between the column and the fluids travelling downwardly and axially therethrough.

Fluid is supplied to the top of the column through a fitting assembly designated generally at 21 and is removed from the bottom of the column and applied to associated apparatus by a fitting assembly indicated generally by reference numeral 22. The fitting which engages the upper part of the column includes a body 23 having an axial protuberance 24 adapted to extend downwardly into the column 11. The end of the protuberance may be grooved to receive an O-ring 26 which provides a seal between the protuberance and the column. The end of the column or tubing is enlarged at 27 to provide an annular shoulder 28. The body 23 includes an annular groove or recess 29 which is adapted to receive the adjacent end of the tubing. The body 23 includes a pair of narrow slots 31 formed on diametrically opposite sides thereof to extend into the body a distance such that the slots open into the grooves 29 on opposite sides. A clip 32 having a bifurcated end 33 is adapted to fit into the spaced parallel slots. The end of the clip may be bent to provide a ridge 34 for rigidity. Insertion of the clip into the associated slot with the tubing seated in the annular groove serves to accommodate the tubing within the slotted or bifurcated end. The distance of this slot from the end is such that the shoulder 28 engages the clip to retain the tubing snuggly in the body 23.

Thus, in applying the upper fitting to the column, all that is required is to fit the protuberance including the O-ring into the tubing. Subsequently, the clip is inserted into the slot.

The body 23 may include means for attaching the fitting to associated apparatus. The body illustrated includes a cylindrical bore adapted to receive a second body 36. The body 36 includes an annular groove 37. The sides of the upper end of the body 23 are slotted to receive a clip which is constructed similar to the clip previously described and thus includes like reference numerals. When the clip is in place, it will hold the member 36 within the body 23.

In a chromatographic column, it is desirable to filter the fluids entering the column through the fittings 23. For this purpose, a filter 38 may be provided at the bottom of the bore and an O-ring provided between the body 36 and the filter to provide sealing engagement. The distance between the annular groove 37 and the face 41 of the member 36 is such that when the clip is in place, it will compress the O-ring 42 against gasket 55 to provide therewith a seal.

The lower fitting assembly 22 includes a body portion 46 which has a ball-shaped lower end 47 to form part of a ball and socket fitting. The body 46 includes a protuberance 50 which extends upwardly into the glass tubing and is provided with a groove for retaining O-ring 48 to provide sealing engagement between the protuberance and the inside column. The body 46 has an annular groove or recess to accommodate the adjacent end of the column. The adjacent end of the column includes an enlarged portion 49 providing a shoulder 51. The body is slotted in the manner previously described to receive a clip 52 of the type previously described. To provide additional sealing, a gasket 53 is placed at the bottom of the groove or recess and is compressed when the clip 52 is inserted in engagement with the shoulder 51.

Thus, it is seen that there has been provided a relatively simple fitting. To assemble the fitting, one merely extends the protuberance into the associated glass tubing and applies the clip. It is observed that this is a relatively high strength fitting since there is no spring loading but direct engagement of all the associated parts, one with the other. The tubing is held in tension against the shoulder by the spring clip. The tensile strength of the tubing is the strength of the joint.

I claim:

1. A fitting for attaching a tube, such as a glass column for a chromatograph or similar apparatus having an enlarged end comprising an external annular shoulder to an associated apparatus comprising a body including a central tubular protuberance adapted to project into the tube, an annular cylindrical wall radially spaced from said tubular protuberance to form an annular groove for receiving the enlarged end of said tube, means for providing a seal between said tube and said body including at least an O-ring seal carried by the outer surface of said protuberance for sealing to the adjacent inside surface of said tube, narrow slots perpendicular to the axis of the protuberance formed in opposite sides of said cylindrical wall and opening into said groove, and a clip having a bifurcated end adapted to slide into said slots with the bifurcated end serving to accommodate the tube and engage the annular shoulder at the enlarged end to limit relative axial movement between the tube and body, said shoulder having an external diameter sufficiently large compared to the internal diameter of said groove to provide a rigid coupling between said tube and said body.

2. A fitting as in claim 1 including means for connecting the fitting to associated apparatus.

References Cited

UNITED STATES PATENTS

| | | | |
|---|---|---|---|
| 332,754 | 12/1885 | Scott | 285—331 |
| 1,019,000 | 2/1912 | Watson. | |
| 1,846,460 | 5/1930 | Smelser | 285—398 X |
| 2,842,125 | 1/1954 | Stephany | 285—238 X |
| 2,772,898 | 12/1956 | Seeler | 285—347 X |

FOREIGN PATENTS

| | | |
|---|---|---|
| 159,874 | 9/1921 | Great Britain. |
| 462,193 | 3/1937 | Great Britain. |
| 902,447 | 8/1962 | Great Britain. |

EDWARD C. ALLEN, *Primary Examiner.*

THOMAS F. CALLAGHAN, CARL W. TOMLIN,
*Examiners.*